United States Patent [19]

Scohy et al.

[11] 3,897,378

[45] July 29, 1975

[54] BINDER RESINS FOR TRAFFIC PAINTS

[75] Inventors: John M. Scohy, Vienna, W. Va.;
George E. Cremeans, Groveport;
Manfred Luttinger, Columbus, both of Ohio

[73] Assignee: Borg-Warner Corporation, Chicago, Ill.

[22] Filed: May 29, 1974

[21] Appl. No.: 474,297

[52] U.S. Cl. ..... 260/22 CB; 260/880 R; 260/998.19
[51] Int. Cl. ............................................. C09d 3/66
[58] Field of Search ................... 260/22 CB, 998.19

[56] References Cited
UNITED STATES PATENTS

| | | | |
|---|---|---|---|
| 2,229,882 | 1/1941 | Binspfl et al. | 260/736 |
| 2,231,370 | 2/1941 | Reid | 260/727 |
| 2,824,502 | 2/1958 | Rockwell et al. | 404/94 |
| 2,897,732 | 8/1959 | Shuger | 404/14 |
| 3,264,234 | 8/1966 | Osmond | 260/22 CB |
| 3,286,605 | 11/1966 | Wilson et al. | 404/94 |
| 3,474,057 | 10/1969 | de Vries | 260/22 CB |
| 3,505,256 | 4/1970 | Duffy et al. | 260/22 CB |
| 3,595,840 | 7/1971 | Moberly et al. | 260/87.3 |
| 3,644,584 | 2/1972 | Fryd | 260/880 R |
| 3,758,640 | 9/1973 | Thorpe | 260/880 R |

FOREIGN PATENTS OR APPLICATIONS

| | | | |
|---|---|---|---|
| 635,291 | 4/1950 | United Kingdom | 404/14 |
| 676,172 | 12/1963 | Canada | 260/22 CB |
| 716,142 | 8/1965 | Canada | 260/22 CB |

OTHER PUBLICATIONS

Singer, Fundamentals of Paint, Varnish and Lacquer Technology, The American Paint Journal Company, St. Louis, Mo., 1957, pp. 167–169 & 281.

Primary Examiner—Ronald W. Griffin
Attorney, Agent, or Firm—Richard J. Schlott

[57] ABSTRACT

Alkyd-compatible second binder resins for use in traffic paint formulations are prepared from an alkylstyrene, an alkyl acrylate and butadiene by graft polymerization of alkylstyrene and alkyl acrylate onto a preformed alkyl styrene-butadiene substrate. The product resins, comprising 50% to 90% by weight of an alkyl styrene, 0.5 to 5% by weight of a conjugated diene and 29.5 to 10% by weight of an alkyl acrylate, are employed in reflectorized alkyd traffic paint formulations to provide enhanced compatibility with aliphatic solvents, rapid drying, good wear properties, and improved retention and reflectivity.

6 Claims, No Drawings

BINDER RESINS FOR TRAFFIC PAINTS

BACKGROUND OF THE INVENTION

This invention relates to quick-drying coating compositions comprising a synthetic coating resin and an alkyd resin which are especially suited for use as traffic paints. More particularly, this invention relates to synthetic coating resins prepared from an alkylstyrene, an acrylate monomer and butadiene which may be blended with oil-modified alkyd resins to form quick-drying coating compositions.

Oil-modified alkyd resins, wherein the modifying oil is a drying oil, e.a. linseed, oil, soya oil, tung oil, etc., are widely used as binders in paints and coatings applications. While such resins may be formulated to produce durable traffic paints, they are generally unsatisfactory for use where rapid drying of thick layers is desirable unless further modified. This is due in part to the dyring characteristics of such resins, which do not crosslink rapidly enough to give fast surface drying. On the other hand, the synthetic coating resin can be made to dry on the surface rapidly by selection of solvents of proper volitility. Fast surface drying results in nearly impermeable surface films and entrapment of solvent which is severely then inhibited from A number of methods have been employed to improve the drying characteristics of alkyd resins for use in traffic paints, including the adding of reactive comonomers and the grafting thereon of such monomers as styrene and alkyl acrylates. An alternate approach has been to combine the alkyd with a synthetic resin binder material by blending. The second binder material is selected to give a rapid, lacquer-type drying effect, which holds the entire thick film in place and protects the structure during the air-dry reaction of the alkyd. The alkyd resin in turn overcomes the solvent entrapment characteristics of the synthetic resin. In order to be useful for such purposes, the second binder resin must be compatible with the alkyd. One example of such a second binder resin which has had a fair degree of success in traffic paint formulations is chlorinated rubber. When rubber-chloride is used in blends with alkyds, coating compositions exhibiting drying times in the 5 to 10 minute range are possible.

An additional and necessary property characteristic is that both the second binder resin and the alkyd must be soluble in a common solvent or solvent mixture in order to be useful as a paint. Where chlorinated rubbers are employed, only aromatic hydrocarbons, aliphatic esters and/or ketones have adequate solvent properties. Aromatic hydrocarbons are regarded as polluting solvents and are subject to use restrictions. Aliphatic esters are also subject to some restriction, are more expensive as well, and thus are less desirable as substitute solvents. Substitution of aliphatic hydrocarbons into alkyd/chlorinated rubber paint formulations causes separation due to insolubility of the chlorinated rubber component. Synthetic second binder resins which can impart quick-drying characteristics to alkyd paint formulations and which are compatible with alkyds and soluble in solvent mixtures containing nonpolluting solvents such as aliphatic hydrocarbons are therefore highly desirable as replacements for the chlorinated rubber component of common traffic paint formulations.

SUMMARY OF THE INVENTION

It has been found that fast-drying paint resins suitable for use in traffic paint formulations and having adequate compatibility with aliphatic hydrocarbon solvents can be prepared by blending alkyds with certain polymers prepared from alkylstyrene, acrylate and conjugated diene monomers. More specifically, polymers which contain from 50% to about 90% and preferably greater than 70% by weight alkylstyrene, together with from about 0.5% to about 5% by weight of butadiene and the remainder as alkyl acrylate exhibit alkyd compatibility and solubility in solvent mixtures containing high levels of aliphatic hydrocarbons adequate for use in blending with oil modified alkyds for traffic paint formulations. These polymers impart fast dry characteristics to the resulting paint film, and 15 mil thick coatings drying in less than five minutes can be attained. Additionally, adhesion and wear properties of the resulting films are enhanced and the adhesion to fillers and in particular to reflective glass beads is improved.

DETAILED DESCRIPTION

The alkylstyrene monomers suitable for use in preparing the polymers useful in the practice of this invention are styrenes having $C_1$–$C_4$ alkyl group substituents on the aromatic ring portion. Examples of such monomers include the vinyl toluenes, the ethylstyrenes, the propylstyrenes and the butylstyrenes, either as single isomers or as mixed isomers. While it has been found that for example t-butylstyrene is quite suitable for these purposes, the ready availability and lower cost of vinyltoluene suggest that these latter systems will be commercially preferred.

The alkyl acrylates suitable for use in the polymers of this invention include the acrylic acid esters of $C_2$ to $C_{10}$ alcohols. Such common monomers as ethyl acrylate, propyl acrylate, butyl acrylate, hexyl acrylate, octyl acrylate and decyl acrylate are representative examples.

It will be readily apparent that one of the purposes of employing a modifying binder resin in oil modified alkyd paints is to impart hardness and gloss to the resulting film. For that reason, it is necessary that the greater part of the resin composition consist of the alkylstyrene component. As is well known, alkyl acrylate polymers, particularly where the alkyl group is butyl or greater in size, are rubbery and often tacky materials. It is therefore desirable that the proportion of acrylate be only great enough to impart some weatherability and to decrease the brittleness of the polymer. The alkyl acrylate portion will therefore be no greater than 49% by weight of the total polymer and preferably no greater than 30% by weight.

The structure of the polymers useful for the purposes of this invention takes the form of a conventional graft copolymer and it is necessary that very small amounts of a conjugated monomer be included to afford grafting sites.

The conjugated dienes suitable for use in the polymers of this invention will include $C_4$–$C_7$ dienes exemplified by 1,3-butadiene, isoprene, piperylene, 2,3-dimethyl-1,3-butadiene, and 2,4-heptadiene. As is well known, the use of large amounts of butadiene or other dienes in polymers imparts decreased weatherability. Hence for the purposes of this invention, the proportion of diene monomer employed will be small, normally no more than about 5% by weight of the total composition.

These resins may be prepared by a variety of standard processes. The most satisfactory resins for our purposes as determined by alkyd compatibility, are graft copolymers wherein the acrylate monomer and a portion of the alkylstyrene are graft copolymerized in the presence of a preformed alkyl styrene-butadiene backbone polymer. The alkyl styrene-butadiene backbone may also be prepared by any of the standard polymerization methods, but normally will be obtained by latex copolymerization of a mixture of the alkylstyrene monomer and butadiene. The grafting step may then be conveniently carried out by emulsion processes, employing the backbone polymer latex without isolation. The preparation of alkyl styrene-alkylacrylate binder resins suitable for the purposes of this invention is further illustrated by the following examples.

EXAMPLE 1

A first stage vinyltoluene-butadiene copolymer latex was prepared by charging a stirred polymer reactor with the following ingredients:

| | | |
|---|---|---|
| Vinyltoluene | 95.0 | pbw |
| Butadiene | 5.0 | pbw |
| t-Dodecyl Mercaptan | 0.40 | pbw |
| Sodium Hydroxide | 0.143 | pbw |
| Potassium Persulfate | 0.26 | pbw |
| Water, Demineralized | 182.28 | pbw |

The reaction mixture was stirred and heated to 70°C., and held at 70°C. with stirring for four hours, then cooled. The solids content of the resulting latex was 35.0% by weight, the final pH was 10.6.

The second stage, the preparation of the graft polymer, was carried out using a portion of the vinyltoluene-butadiene latex prepared above. A stirred polymer reactor was charged with the following ingredients:

| | | | |
|---|---|---|---|
| Stage 1 latex | 20.0 | pbw | (on Solids) |
| Vinyltoluene | 65.0 | pbw | |
| n-Butyl Acrylate | 15.0 | pbw | |
| t-Dodecyl Mercaptan | 0.40 | pbw | |
| Dehydroabietic Acid, Sodium Salt | 2.28 | pbw | |
| Sodium Hydroxide | 0.114 | pbw | |
| Potassium Persulfate | 0.14 | pbw | |
| Water, Demineralized | 183.07 | pbw | |

The stirred reaction mixture was heated to 70 C. and held at that temperature with stirring for 4 hours. The latex was cooled, coagulated by addition to aqueous aluminum sulfate, collected and dried at 49°C. until the volatile content was less than 1 wt. percent. The product polymer, containing vinyltoluene, butadiene and n-butyl acrylate in the ratio 84/1/15, was obtained in 93% yield.

It will be understood that the polymer-forming procedures described in Example 1 are typical of emulsion polymerization procedures widely practiced in the art. The product graft polymers contemplated by this invention may be prepared by a variety of polymerization processes, as has been said. Possible modifications, including the use of other initiators, surfactants, temperatures and times are possible and will be quite apparent to one skilled in the art.

EXAMPLE 2-5

Graft polymer resins were obtained from a variety of monomer ratios and monomer types essentially by the procedure set forth as Example 1. These graft polymers are summarized below:

| Example No. | Alkylstyrene | Acrylate | Ratio Alkylstyrene/Butadiene/Acrylate | | |
|---|---|---|---|---|---|
| 2 | t-Butylstyrene | n-Butyl Acrylate | 84 | 1 | 15 |
| 3 | Vinyltoluene | n-Butyl Acrylate | 79 | 1 | 20 |
| 4 | Vinyltoluene | Ethyl Acrylate | 84 | 1 | 15 |
| 5 | Vinyltoluene | Ethyl Acrylate | 79 | 1 | 20 |

Table I

PAINT FORMULATIONS AND TESTING DATA

| Material | CONTROL | EXAMPLES | | | | | |
|---|---|---|---|---|---|---|---|
| | | 6 | 7 | 8 | 9 | 10 | 11 |
| Alkyd Resin* | 130 | 110 | 115 | 110 | 110 | 77 | 77 |
| Chlorinated Parafin | 75 | 66 | 46.4 | 66 | 66 | 45 | 45 |
| Chlorinated Rubber | 100 | — | — | — | — | — | — |
| Example 1 Graft Resin | — | 100 | 92.8 | — | 100 | — | — |
| Example 2 Graft Resin | — | — | — | 100 | — | 013 | — |
| Example 3 Graft Resin | — | — | — | — | — | — | 125 |
| Example 5 Graft Resin | — | — | — | — | — | 125 | — |
| Med. Chrome Yellow | — | — | — | — | 200 | — | — |
| Titanium Dioxide | 200 | 200 | 200 | 200 | 25 | 200 | 200 |
| Magnesium Silicate | 175 | 200 | 200 | 200 | 210 | 150 | 150 |
| Zinc Oxide | 50 | — | — | — | — | — | — |
| Calcium Carbonate | 150 | 175 | 175 | 175 | 185 | 225 | 225 |
| Pigment Suspending Agent | 2 | 2 | 2 | 2 | 2 | 2 | 2 |
| Methanol | 5 | — | — | — | — | 1 | 1 |
| Lead Naphthenate | 2 | 0.86 | 1.2 | 0.86 | 0.86 | 0.6 | 0.6 |
| Cobalt Naphtnenate | 0.5 | 0.17 | 0.23 | 0.23 | 0.17 | 0.24 | 0.24 |
| Anti Skin Agent | 3 | — | — | — | — | 3 | 3 |
| Epichlorohydrin | 3 | — | — | — | — | — | — |
| Methyl Ethyl Ketone | 255 | 105.5 | 97.5 | 105.5 | 105.5 | 93 | 93 |
| Methylamyl Acetate | 35 | — | — | — | — | — | — |
| Cyclohexane | — | 23.3 | 58.8 | 63.3 | 63.3 | — | — |
| Hexane | — | 96.2 | 90.1 | 96.2 | 96.2 | — | — |
| V.M. + P. Naphtha** | — | — | — | — | — | 213 | 213 |

Table 1 — Continued

PAINT FORMULATIONS AND TESTING DATA

| Material | CONTROL | EXAMPLES | | | | | |
|---|---|---|---|---|---|---|---|
| | | 6 | 7 | 8 | 9 | 10 | 11 |
| TEST | | Test Results | | | | | |
| Dry Time, Min. (ASTM D-711) | 5 | 5 | 4.5 | 9 | 6 | 3.75 | 4.5 |
| Abrasion | 4 | 7.7 | 4.1 | 3.6 | — | 4.6 | 4 |
| Field Wear, 24 Hr. | 10 | 9 | 10 | 1 | 9 | 10 | 10 |
| Concrete, 3 mo. | 7 | 7.5 | 7 | 6 | 9 | — | — |
| Asphalt, 3 mo. | 8 | 8.5 | 8 | 6.5 | 9 | 8 | 8 |

*Medium, soya oil alkyd, 60% non-volatiles
** The V.M. & P. Naphtha used had analysis of 90% paraffins and cycloparaffins and 10% aromatics (nearly all toluene).

The resins of examples 1–5 were evaluated as binder resins in typical traffic paint formulations. The formulations employed are summarized in Table I, examples 6–11 and a control formulation.

The comparative tests employed were carried out as follows:

Drying time is the time required to dry to a no-pickup surface at 78°F. The procedure followed was the standarized procedure of ASTM D–711.

Abrasion is a standard measure of a film's resistance to wear, and is expressed as gallons of falling sand required to wear through a 2.0 mil paint film. High numbers indicate high abrasion resistance.

Field Wear tests were carried out by painting stripes on a city street transverse to the direction of traffic flow, and evaluating apperance in 24 hours and 3 months. The 24 hour rating reflects tracking and dirt pickup, the 3 month rating reflects amount of visible wear. The best rating is 10, the lowest 1.

Drying time data demonstrate that no-pick-up 15 mil coatings can be achieved in times comparable with those for the control systems. In general, the systems with drying times under 6 minutes will dry to a "no-track" surface in one minute or less, and will thus exhibit good resistance to dirt pickup in the initial wear stages. Field test data show that many of the formulations employing the modifying binder resins of this invention perform as well as the widely-used control formulation, and in some instances significant improvement is realized. A softer resin, example 8 gave poorer 24 hour appearances because of higher dirt pickup. Nonetheless, most of these resins also approached the performance of the control when compared for longer term wear properties.

As was said, the solubility of these resins in aliphatic hydrocarbons is great enough to permit levels of aliphatic solvents that would cause separation of chlorinated rubber from blends. For example, a clear solution of the binder resin of Example 4 can be made at 33% solids with a 22/78 mixture of methyl ethyl ketone and hexane, a 7/93 mixture of methyl ethyl ketone and heptane or a 7/93 mixture of methylene chloride and heptane. Chlorinated rubber is precipatated at levels greater than 15% aliphatic hydrocarbon.

The second binder resins of this invention may be utilized in cold-applied traffic paints and in hot-applied spray application traffic paints when suitably formulated for the particular purpose. The particular solvent blends employed in these formulations may be varied to accomodate the envisioned method of application, and the selection of a particular second binder resin will also depend in part on the application method to be used. By way of illustration, the resin of Example 4 is considerably less soluble in blends with alkyds in hexane at elevated temperatures than is the resin of Example 3, and a hot-applied film of traffic paint employing the resin of Example 4 will dry to a "no-track" condition much more rapidly than an equivalent formulation employing the second binder resin of Example 3. This capability is due in part to the requirement that the second binder resin rapidly dry to a condition capable of holding the film structure in place. This lacquer-type drying character is solvent-dependent, and is enhanced when the second binder resin is not highly soluble in solvent retained by the film on application. This character can be further improved, particularly for cold-applied formulations, when the solvent mixture includes a less-volatile component which is a non-solvent with respect to the second binder resin and a solvent for the alkyd. In such formulations, the loss of the most volatile solvent causes an imbalance of solubilities which assists the film-forming and lacquer-type drying properties of the film structure. A small amount of a third, least-volatile solvent component having solvent properties for both binder resins is desirable to ensure that the final film integrity is maintained after the slower air-dry curing of the alkyd. The particular solvent mixtures to be employed for particular formulations and application methods are best determined by experiment, and the combinations given for Examples 6–11 are for purposes of illustration only and not by way of limitation.

Traffic paints require a high degree of reflectivity for purposes of night-time visability. The enhanced reflectivity is normally accomplished by the addition of fine glass particles, normally in the form of discrete spheres or beads. This practice as widely known and described in the art, may be employed with traffic paint formulations which utilize the second binder resins of this invention, and the reflective particles may be applied to the surface of the paint by any of a variety of spreading and spraying methods immediately after application of the traffic paint to the substrate. It is also conceivable that the reflective particles may be applied with the traffic paint, however, such methods would require that some wear of the surface occur to expose the beads before significant reflectivity improvement would be noted. Examination of traffic paints prepared for example according to the formulation given as Example 11 in Table I, when reflecterized by the spreading of glass beads upon the tacky surface before drying, exhibit enhanced reflectivity when compared with the reflecterized traffic paints represented by control Example A. Microscopic comparisons of test specimens show that a higher fraction of each bead is exposed above the surface of the formulation based on Example 11 as compared with that of Example A, and hence greater reflectivity results. Laboratory abrasion tests of these specimens show an enhanced wearing characteristic which by microscopic observation appears to be due to loss of very small amounts of the binder resin with the removal beads as compared to the control, where loss of beads results in tearing away of considerable portions of the paint film. It would thus appear that adhesion to the bead and to the substrate is very high for the paint formulations employing the second binder resins of this invention, which results in very low bead loss on abrasion, and further that film cohesion is sufficiently great to prevent major losses of paint film when bead loss does occur.

It will be apparent that the alkylstyrene-alkyl acrylate-butadiene graft polymers of this invention are particularly suitable for use in blends with alkyd resins to prepare binders for traffic paint formulation which exhibit fast-dry characteristics and improved adhesion and wear properties. It will be understood by those skilled in the art that further variation in polymer composition through modification of the preparative methods herein disclosed are possible without departing from the spirit and scope of the invention which is defined solely by the appended claims.

We claim:

1. In a traffic paint formulation comprising an alkyd resin, a chlorinated paraffin plasticizer, a second binder resin, pigments, fillers and a solvent mixture, the improvement wherein said second binder resin is an alkyd compatible graft polymer comprising from about 50 to about 90% by weight of an alkylstyrene selected from the group vinyl toluene, ethylstyrene, propylstyrene, and butylstyrene, from about 0.5% to about 5% by weight of a $C_1$ to $C_7$ conjugated diene, from about 49.5% to about 10% by weight of an acrylic acid ester of a $C_2$–$C_{10}$ alcohol.

2. The traffic paint formulation of claim 1 wherein the solvent mixture comprises a predominant proportion of aliphatic hydrocarbon solvent.

3. The traffic paint formulation of claim 1 wherein the $C_4$–$C_7$ conjugated diene is 1,3-butadiene.

4. A traffic paint formulation as defined in claim 1 wherein the graft polymer has the composition 79–84% by weight vinyltoluene, 1% by weight 1,3-butadiene, and 20–15% by weight n-butyl acrylate.

5. A traffic paint formulation as defined in claim 1 wherein the graft polymer has the composition 84% by weight t-butylstyrene, 1% by weight 1,3-butadiene and 15% by weight n-butyl acrylate.

6. A traffic paint formulation as defined in claim 1 wherein the second binder resin has the composition 79–84% by weight vinyltoluene, 1% by weight 1,3-butadiene, and 20–15% by weight ethyl acrylate.

* * * * *